No. 704,438. Patented July 8, 1902.
N. CONTI.
PANORAMIC HAND CAMERA.
(Application filed Dec. 8, 1900.)
(No Model.) 3 Sheets—Sheet 2.
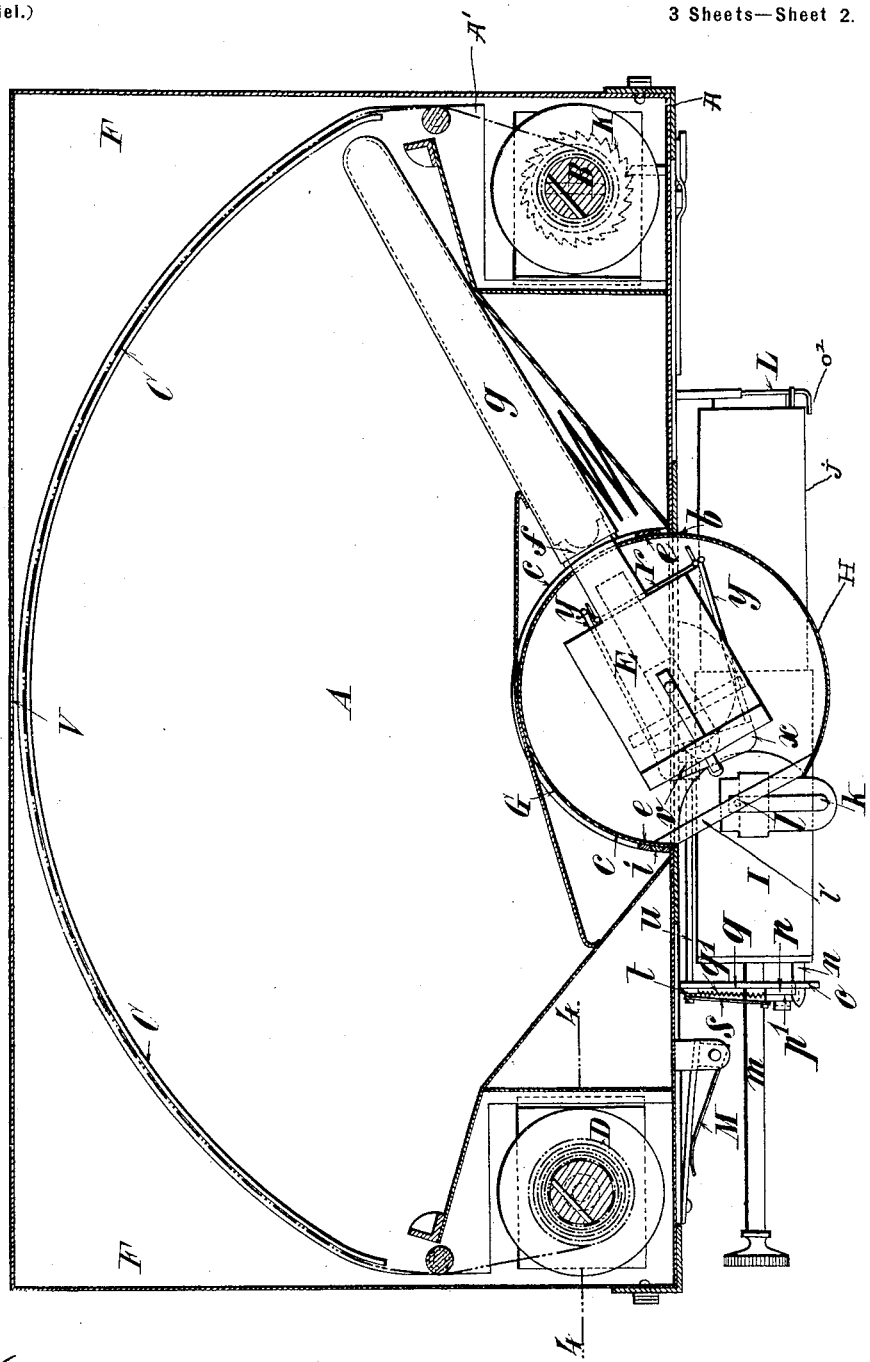

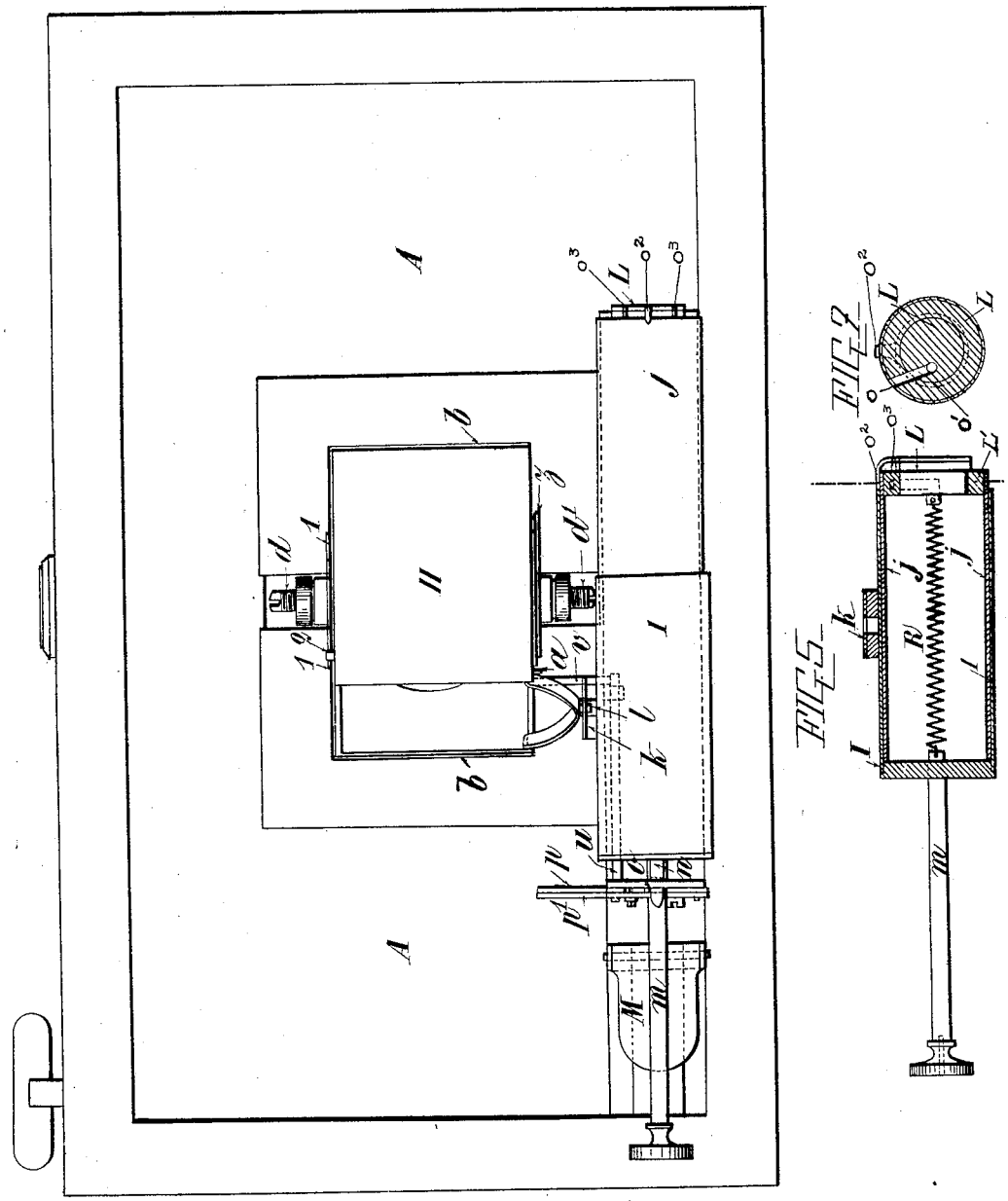

No. 704,438. Patented July 8, 1902.
N. CONTI.
PANORAMIC HAND CAMERA.
(Application filed Dec. 8, 1900.)
(No Model.) 3 Sheets—Sheet 3.
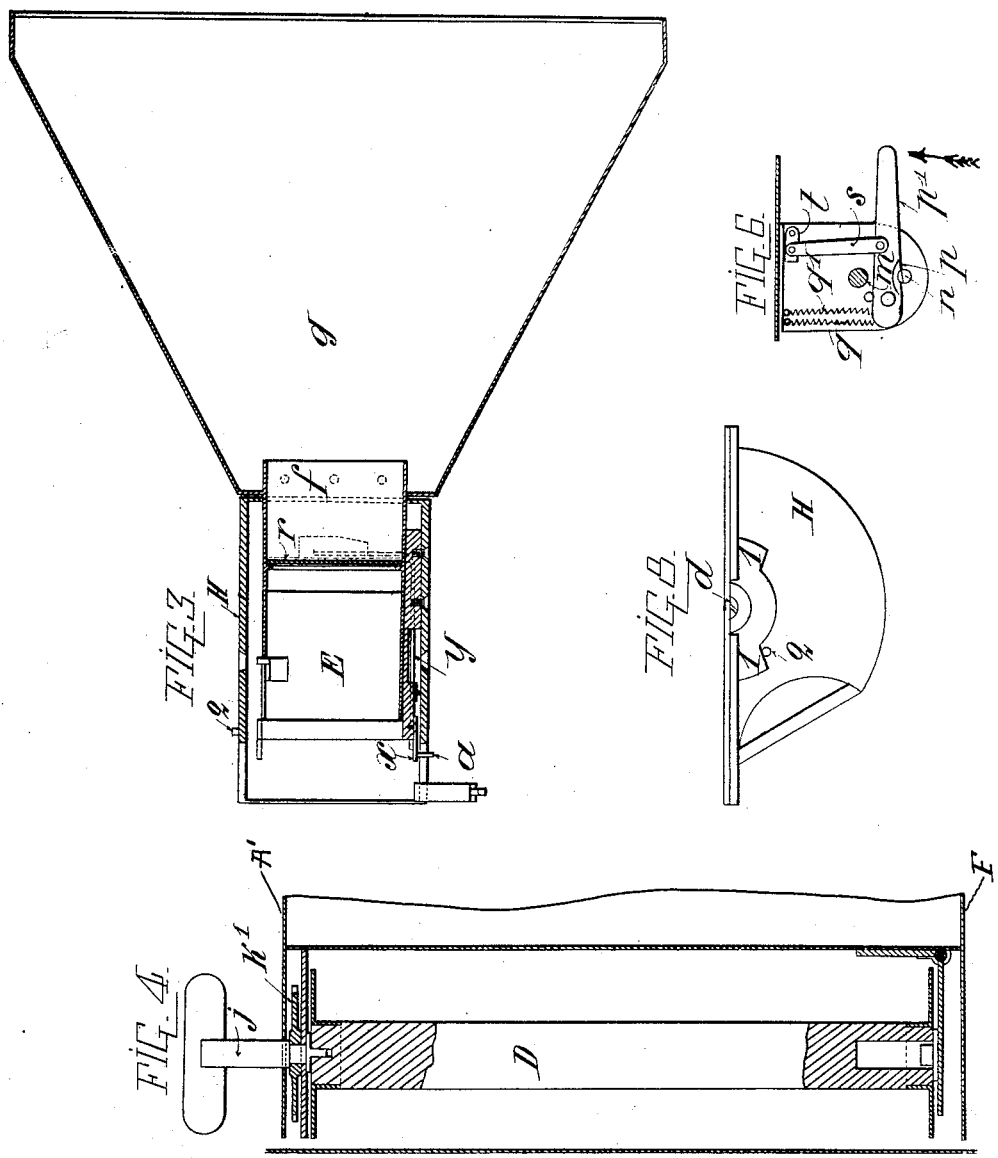

UNITED STATES PATENT OFFICE.

NAPOLEON CONTI, OF PARIS, FRANCE.

PANORAMIC HAND-CAMERA.

SPECIFICATION forming part of Letters Patent No. 704,438, dated July 8, 1902.

Application filed December 8, 1900. Serial No. 39,224. (No model.)

*To all whom it may concern:*

Be it known that I, NAPOLEON CONTI, a citizen of the Republic of France, and a resident of Paris, France, have invented a new and useful Improvement in Panoramic Hand-Cameras, which is fully set forth in the following specification.

My invention consists of a photographic apparatus for taking panoramic views and will be best understood by reference to the accompanying drawings, wherein—

Figure 1 is a front elevation. Fig. 2 is a horizontal section. Fig. 3 is a longitudinal section through the light-shaft and lens-tube at the small end of said light-shaft. Fig. 4 is a section on line 4 4 of Fig. 2. Fig. 5 is a section of the spring mechanism for moving the light-shaft and parts associated therewith. Fig. 6 is a detail view illustrating the catch mechanism for holding and releasing the stem of the spring-motor mechanism. Fig. 7 is a detail of the valve for varying the size of the air-exit opening leading from the cylinder of the spring-motor mechanism. Fig. 8 is a detail illustrating the stop arrangement for limiting the movement of the light-shaft and associated parts.

Referring to the drawings, A is the front plate of a casing. From plate A at its upper and lower edges project two plates A' A'.

C is a curved glass plate suitably supported between the rear edges of plates A' A'.

F is a casing adapted to be closed at one side by plate A, which latter carries most of the mechanism of the camera.

B is a film spool or roller removably located in one side of the casing F and from which the film passes over the convex surface of glass plate C to a receiving spool or roller D, located in the other side of the casing and operated by a removable key J. Ratchet-wheels K K' insure perfect tension of the film.

H is a cylindrical drum closed at top and bottom vertically pivoted at $d$ $d'$ (on an axis coincident with its cylindrical axis) to rotate in an opening through the plate A. Within drum H and in the line of openings through the front and rear walls thereof is a horizontally-disposed cylindrical tube E, which has an extension $f$ of rectangular cross-section opening into one end of a light-shaft $g$. The latter is secured so as to travel with drum H, and during this movement its rear open and spread end moves in close proximity to the inner concave surface of glass C. A suitable lens having a focus equal to the radius of the curvature of glass C is located in tube E. A shutter $r$ is operated, as described hereinafter, to open and close the passage leading from tube E into extension $f$.

The means for moving the drum H and for automatically operating the shutter $r$ in the operation of taking a picture will now be described. $j$ is a cylinder or sleeve open at one end rigidly secured to plate A. The other end of this cylinder is closed by a plug L, rotatable in a ring L', secured to the sleeve. A passage $o$ through ring L' leads at its outer end to the atmosphere. A passage $o'$ through plug L communicates at its inner end with the space within the cylinder and at its outer end (in the periphery of the plug) registers more or less with the passage $o$, according to the position of the plug. The plug may be rotated by an arm $o^2$ thereon, movement being limited in opposite directions by stop-pins $o^3$ $o^3$. It will thus be seen that by varying the position of plug L the size of the opening leading to the atmosphere may be changed as desired.

I is a piston in the form of a second cylinder, closed at one end and telescoped over the open end of cylinder $j$. A coiled spring R connects the cylinders and normally tends to hold them in and return them to the position shown in Fig. 5. By means of a handle $m$ an operator can move cylinder I to the left, stretching spring R and drawing air into the cylinders through the passages $o$ $o'$. When cylinder I arrives at the position shown in Fig. 2, a notched pin $n$ thereon projects through an opening in a fixed plate $o$ and the notch is engaged by spring-actuated detent-lever $p$, as shown in Fig. 6, (the lever $p'$ being cut away, so as not to engage pin $n$,) and held until the operator by pressing on the lever $p$ disengages it from the hook. When the cylinder I is thus released, the spring draws it to the right with a regular movement, the speed of which may be regulated as desired by varying the size of the air-exit opening, as already explained. A spring $q$, Fig. 6, tends to normally hold lever $p$ in position for engagement with the notched pin *n*.

The drum H and its associated parts are caused to move with cylinder I through the following connections, to wit: A plate *k*, secured to the upper side of cylinder I, has a laterally-extending slot therein. Said slot is engaged by a depending pin *l* on a bowed metal strip *l'*, secured to drum H. As the cylinder I moves pin *l* is caused to travel from one end of its slot to the other, at the same time rotating drum H on its pivots *d d'* in the construction shown through an arc of about one hundred and twenty-five degrees. Movement of drum H is limited by a pin 2 thereon, Fig. 8, striking abutments 1 1.

Shutter *r*, heretofore referred to, consists of a thin metallic plate having an opening at one side. To close the shutter, the plate is slid to the position shown in Fig. 2. To open the shutter, it is moved to the left, so as to bring the opening into register with tube E and its extension *f*, permitting rays of light to pass through light-shaft *g* and act on the sensitive film. The shutter is automatically opened at the beginning of the movement of drum H and closed at the end of said movement by the following mechanism: *x* is an oscillatory frame pivoted to the under side of tube E and having two arms *y y* bent upwardly, so as to bear against the opposite ends of shutter *r*.

*a* is a stud depending from frame *x* and adapted to be engaged by an upwardly-projecting arm *v* to oscillate the frame on its pivot and impart movement to shutter *r*. Arm *v* is carried by shaft *u*, and the latter is oscillated in opposite directions by lever *p'* through link *s* and short arm *t*, Fig. 6. A spring *q'* normally returns lever *p'* to and holds it in the position shown in Fig. 6. When the parts are in the position shown in Fig. 2, the shutter is closed. From the preceding description it will be understood that when the operator presses upon both levers *p p'* and moves them (against the tension of their actuating-springs) in the direction indicated by the arrow, Fig. 6, the shutter is opened simultaneously with the release of cylinder I and beginning of the movement of drum H. When the drum reaches the limit of its movement, stud *a* strikes the edge of a plate *z*, Fig. 1, oscillating frame *x* and automatically moving the shutter to its closed position. The shutter remains closed until again opened in the manner above explained.

In order to enable the position of the lens to be adjusted to obtain the proper focus, reflections are made upon a ground-glass plate of the same size and shape as transparent-glass plate C and momentarily substituted for the latter. When desirable, the propelling mechanism may be disconnected and drum H moved by hand.

What I claim is—

1. In a camera for photographing panoramic views, a rotatable drum, a lens mounted in said drum, a light-shaft movable with the drum and through which the lens is adapted to project rays of light onto a sensitized surface, a shutter mounted in and movable with the drum, motor mechanism for rotating the drum, a detent for holding the motor mechanism set and adapted to be operated to release the motor mechanism, and shutter-opening means operated simultaneously with the release of the motor mechanism.

2. In a camera for photographing panoramic views, a rotatable drum, a lens mounted in said drum, a light-shaft movable with the drum and through which the lens is adapted to project rays of light onto a sensitized surface, a shutter mounted in and movable with the drum, motor mechanism for rotating the drum, a detent for holding the motor mechanism set and adapted to be operated to release the motor mechanism, shutter-opening means operated simultaneously with the release of the motor mechanism, and means automatically closing the shutter at the proper time.

3. In a camera for photographing panoramic views, a rotatable drum, a lens mounted in said drum, a light-shaft movable with the drum and through which the lens is adapted to project rays of light onto a sensitized surface, a shutter mounted in and movable with the drum, motor mechanism for rotating the drum, a detent for holding the motor mechanism set and adapted to be operated to release the motor mechanism, shutter-opening means operated simultaneously with the release of the motor mechanism, means automatically closing the shutter at the proper time, a curved transparent-glass plate so mounted that the end of the light-shaft travels in proximity with its concave surface, a sensitized film stretched over the convex surface of the glass plate, and means for moving the film.

4. In a camera, the combination with a rotatable drum and a lens mounted therein for projecting rays of light onto a sensitized surface, of means for rotating said drum consisting of a fixed cylinder having a vent-opening at one end, a piston operating in conjunction with the cylinder and adapted when moved in one direction by the operator to draw air into the cylinder through the vent-opening, a spring placed under tension by the said movement of the piston and adapted to impart a reverse movement to the piston expelling the air from the cylinder through the vent-opening, and connections for imparting movement from the piston to the drum.

5. In a camera, the combination with a rotatable drum and a lens mounted therein for projecting rays of light onto a sensitized surface, of means for rotating said drum consisting of a fixed cylinder having a vent-opening at one end, a piston operating in conjunction with the cylinder and adapted when moved in one direction by the operator to draw air into the cylinder through the vent-opening, a spring placed under tension by the said movement of the piston and adapted to impart a reverse movement to the piston expelling the air from the cylinder through the vent-opening, means for adjusting the size of the vent-opening, and connections for imparting movement from the piston to the drum.

6. In a camera, the combination with a rotatable drum, a lens mounted therein for projecting rays of light onto a sensitized surface, of means for rotating said drum consisting of a fixed cylinder having a vent-opening at one end, a piston operating in conjunction with the cylinder and adapted when moved in one direction by the operator to draw air into the cylinder through the vent-opening, a spring placed under tension by the said movement of the piston and adapted to impart a reverse movement to the piston expelling the air from the cylinder through the vent-opening, a detent for holding the piston against said reverse movement and the spring under tension but adapted to be manipulated by the operator to release the piston, and connections for imparting movement from the piston to the drum.

7. In a camera, the combination with a rotatable drum, a lens mounted therein for projecting rays of light onto a sensitized surface, and a shutter movable with the drum, of means for rotating said drum consisting of a fixed cylinder having a vent-opening at one end, a piston operating in conjunction with the cylinder and adapted when moved in one direction by the operator to draw air into the cylinder through the vent-opening, a spring placed under tension by the said movement of the piston and adapted to impart a reverse movement to the piston expelling the air from the cylinder through the vent-opening, a detent for holding the piston against said reverse movement and the spring under tension but adapted to be manipulated by the operator to release the piston, connections from the detent to the shutter whereby the latter is opened simultaneously with the release of the piston, and connections for imparting movement from the piston to the drum.

In testimony whereof I have signed this specification in the presence of two subscribing witnesses.

NAPOLEON CONTI.

Witnesses:
   EMILE LEDRET,
   EDWARD P. MACLEAN.